(12) United States Patent
Takahashi

(10) Patent No.: US 7,920,754 B2
(45) Date of Patent: Apr. 5, 2011

(54) TELEVISION IMAGE FILTERING

(75) Inventor: Tsutomu Takahashi, Slough (GB)

(73) Assignee: Pioneer Digital Design Centre Ltd., Slough (GB)

( * ) Notice: Subject to any disclaimer, the term of this patent is extended or adjusted under 35 U.S.C. 154(b) by 1195 days.

(21) Appl. No.: 11/492,969

(22) Filed: Jul. 26, 2006

(65) Prior Publication Data

US 2007/0071351 A1    Mar. 29, 2007

(30) Foreign Application Priority Data

Sep. 28, 2005    (EP) .................................... 05256050

(51) Int. Cl.
*G06K 9/40*    (2006.01)
*H04N 5/00*    (2006.01)
*H04N 1/60*    (2006.01)
*H04N 1/40*    (2006.01)

(52) U.S. Cl. ......... 382/260; 382/254; 348/606; 358/1.9; 358/447; 358/461

(58) Field of Classification Search .......... 382/254–275; 348/606–624; 358/1.9–3.31, 447, 461, 463
See application file for complete search history.

(56) References Cited

U.S. PATENT DOCUMENTS

| 5,392,137 | A | 2/1995 | Okubo | |
|---|---|---|---|---|
| 6,208,763 | B1 | 3/2001 | Avinash | |
| 6,343,158 | B1 * | 1/2002 | Shiohara | 382/261 |
| 2003/0026495 | A1 * | 2/2003 | Gondek et al. | 382/261 |
| 2003/0053161 | A1 * | 3/2003 | Li et al. | 358/532 |
| 2003/0081854 | A1 * | 5/2003 | Deshpande | 382/261 |
| 2005/0244053 | A1 * | 11/2005 | Hayaishi | 382/164 |
| 2007/0230914 | A1 * | 10/2007 | Garrido et al. | 386/98 |

FOREIGN PATENT DOCUMENTS

EP    0 849 940 A2    6/1998

* cited by examiner

*Primary Examiner* — Anand Bhatnagar
*Assistant Examiner* — Randolph Chu
(74) *Attorney, Agent, or Firm* — Sughrue Mion, PLLC

(57) ABSTRACT

A digital image filtering method and system are provided. A first matrix of a plurality of pixels is selected from a digital image to be displayed. The luminosity values of each of the pixels in the pixel matrix are analysed and the luminosity difference between the maximum and minimum luminosity values thereof is calculated. The central pixel of the matrix is then classified according to the luminosity difference in comparison to a predetermined threshold luminosity value, and the above selection, analysis and classification is repeated for each of the pixels of the image in turn. A target pixel is then selected from the classified pixels for further analysis, wherein a second pixel matrix of which the target pixel is the central pixel is selected, the classification of the pixels surrounding the target pixel in the second matrix is analysed, and the target pixel is filtered to an extent dependent upon the classification analysis.

18 Claims, 1 Drawing Sheet

TELEVISION IMAGE FILTERING

Figure 1:
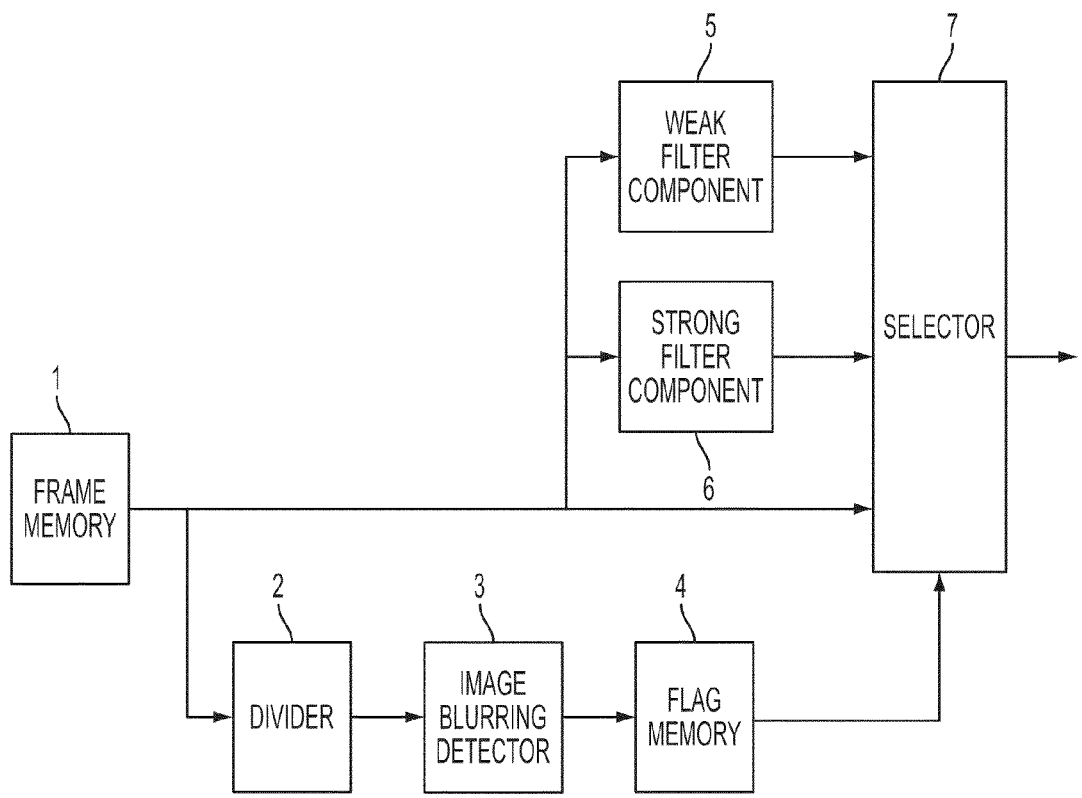

The present invention relates to the improvement of television picture quality. In particular, the invention relates to the detection and filtration of blurring on an image to be displayed.

High Definition Television (HDTV) is currently an area of great interest in the field of digital video transmission, especially in Europe, the United States and Asia. The picture format employed for HDTV in the US and Japan is mainly 1080i (interlace), and the compression method (or codec) used is MPEG2. In Europe, however, HDTV supports the 720p (progressive) format and the codec is, for example, H.264/AVC, which has a better performance than the MPEG2 compression method. However, blurring can be introduced into the encoded images when the H.264/AVC codec is used, and similarly blurring can occur on MPEG2 encoded images due to block noise. This blurring can occur on different areas of the image and is not necessarily of the same intensity/degree across the image. Similarly, blurring can occur when using Standard Definition Television (SDTV), which supports the 576i or 480i format.

Current methods of reducing the blurring apply filters to the whole image in order to sharpen the image. However, such methods often fail to significantly improve the image quality of the picture displayed to a viewer, as areas which were not previously blurred are also subject to the sharpening technique employed, creating areas of the image which are "oversharpened" and leading to images which appear unnatural, and which are therefore uncomfortable on the eye of the viewer.

The present invention seeks to overcome, or at least ameliorate, the aforementioned problems by detecting blurred parts of the image and filtering areas of the image depending on the extent of blurring detected.

According to the present invention there is provided a digital image filtering method comprising the steps of:

selecting a first matrix of a plurality of pixels from a digital image to be displayed;

analysing the luminosity values of each of the pixels in the pixel matrix and calculating the luminosity difference between the maximum and minimum luminosity values thereof;

classifying the central pixel of the matrix according to the luminosity difference in comparison to a predetermined threshold luminosity value;

repeating the above selection, analysis and classification for each of the pixels of the image in turn; and selecting a target pixel from the classified pixels for further analysis, said further analysis comprising the steps of:

selecting a second pixel matrix of which the target pixel is the central pixel;

analysing the classification of the pixels surrounding the target pixel in the second matrix; and filtering the target pixel to an extent dependent upon the classification analysis.

The present invention further provides a digital image filtering system comprising:

a divider for selecting, in use, a first matrix of a plurality of pixels from a digital image to be displayed;

an image blurring detector arranged to analyse, in use, the luminosity values of each of the pixels in the pixel matrix and to calculate the luminosity difference between the maximum and minimum luminosity values thereof;

a flag memory arranged to classify, in use, the central pixel of the matrix according to the luminosity difference in comparison to a predetermined threshold luminosity value;

a selector arranged to select, in use, a target pixel from the classified pixels for further analysis, the target pixel being the central pixel of a second pixel matrix, the selector further being arranged to analyse, in use, the classification of the pixels surrounding the target pixel in the second matrix; and a filter arranged to filter, in use, the target pixel to an extent dependent upon the classification analysis.

Implementation of the present invention leads to an overall improvement in the image quality of HDTV and SDTV digital video transmission.

Figure 2:
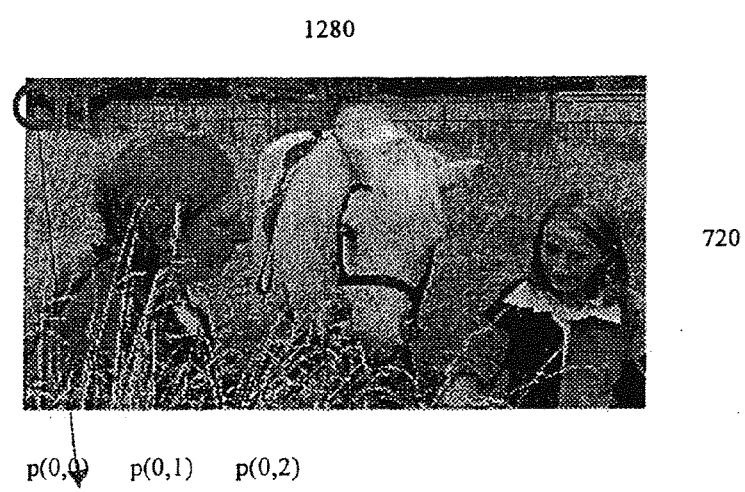

Examples of the present invention will now be described in detail with reference to the accompanying drawings, in which:

FIG. 1 illustrates the components of the system according to the present invention; and FIG. 2 illustrates an image to be filtered according to the present invention, which comprises an array of pixels.

FIG. 1 illustrates a system for performing HDTV/SDTV image filtering according to the present invention. The system comprises a frame memory 1 which stores original picture data and passes this data to a divider 2 for dividing the image to be displayed into areas of pixels to be analysed for blurring. An image blurring detector 3 is connected to the divider 2 and analyses the luminosity values of the pixels to determine the extent of any blurring which occurs. This is flagged for each pixel in turn by a flag memory 4. The data from the flag memory 4 is then passed to a selector 7 which selects whether a weak filter or a strong filter should be applied via weak filter component 5 and strong filter component 6, respectively.

An HDTV image with the picture format 720p consists of 1280 (horizontal)×720 (vertical) pixels, while an HDTV image in the 1080i format has 1920 (horizontal)×1080 (vertical) pixels. Additionally, the present invention may be applied to the SDTV which uses the 576i (720×576 pixels) or 480i (720×480 pixels) format. When carrying out the method of the present invention for either of these picture formats, it is first necessary to classify each pixel of an image to be displayed according to the areas in which blurring is found. In one example of the invention, original picture data stored in a frame memory 1 is divided by a divider 2 into a series of blocks in turn. Initially, a 3×3 pixel block in the top left hand corner of the image is considered, as illustrated by FIG. 2. This block can be represented by the following matrix:

$$p(0,0)\ p(0,1)\ p(0,2)$$
$$p(1,0)\ p(1,1)\ p(1,2)$$
$$p(2,0)\ p(2,1)\ p(2,2).$$

This matrix is chosen in order to classify the central pixel by analysing the luminosity values of the surrounding eight pixels using the image blurring detector 3. Next, the difference between the maximum and minimum luminosity values of the pixels in the block is calculated. For example, if the luminosity values of the pixels of the block are:

30H 32H 95H
30H 33H 96H
31H 32H 97H then the difference calculated is 97H−30H=67H for this block.

In the event that this difference exceeds a predetermined threshold value, the block in question is considered to contain the edge of an object or the edge of a portion of the image to be displayed, in which case the decision is made that this block contains no evidence of blurring. The central pixel of this block is therefore considered to be "clear", and corresponding data is stored in relation to this pixel in a flag memory 4. By contrast, if the difference calculated is less than the predetermined threshold, the pixel block is considered to be a blurred portion of the image and the central pixel is flagged by the system to be a "blurred" pixel.

The next pixel block is then analyzed in the same way:

$$p(0,1)\ p(0,2)\ p(0,3)$$
$$p(1,1)\ p(1,2)\ p(1,3)$$
$$p(2,1)\ p(2,2)\ p(2,3)$$

as is the next:

$$p(0,2)\ p(0,3)\ p(0,4)$$
$$p(1,2)\ p(1,3)\ p(1,4)$$
$$p(2,2)\ p(2,3)\ p(2,4)$$

and this is continued until the final pixel block is analyzed:

$$p(717,1277)\ p(717,1278)\ p(717,1279)$$
$$p(718,1277)\ p(718,1278)\ p(718,1279)$$
$$p(719,1277)\ p(719,1278)\ p(719,1279).$$

Once this analysis has been completed, each of the pixels (as a central pixel of one of the pixel blocks) will have been defined as a "blurred" or "clear" pixel. "Clear" pixels can be said to define an edge within the image.

Once all of the pixels have been defined as blurred or clear, further analysis is performed by the selector 7 in order to decide the extent to which each pixel should be filtered. Consider a "target pixel". A pixel grid of, for example, 17×17 pixels is created using the pixels of eight rows immediately above, eight rows immediately below, eight columns immediately to the left and eight columns immediately to the right of the target pixel, which is again situated in the centre of the pixel grid. Although this example of the invention describes the example of a 17×17 grid, pixel grids of a variety of dimensions can be employed to provide similar analysis and results. If no clear pixels are found in the 17×17 pixel grid (or if all of the pixels in this grid are defined as blurred), then this pixel is considered to be blurred. As such, a relatively strong filter 6 should be applied to the target pixel. If a clear pixel does exist within the 17×17 pixel grid, the grid is reduced in size to, for example, a 9×9 pixel grid (four pixels immediately above, below, left and right of the target pixel, although again a variety of dimensions for the pixel grid is possible) and this grid is similarly analyzed. If no clear pixels are found in the reduced grid, a relatively weak filter 5 is applied to the target pixel. If a clear pixel does exist within the 9×9 pixel grid, no filter is applied and the pixel maintains its current value. Examples of such strong and weak filters are:

$$F(\text{strong}) = \begin{bmatrix} -0.2 & -0.2 & -0.2 \\ -0.2 & 2.6 & -0.2 \\ -0.2 & -0.2 & -0.2 \end{bmatrix}$$

$$F(\text{weak}) = \begin{bmatrix} -0.1 & -0.1 & -0.1 \\ -0.1 & 1.8 & -0.1 \\ -0.1 & -0.1 & -0.1 \end{bmatrix}$$

In addition to a frame processing method, the present invention preferably uses field processing in the case of an interlace picture format.

When employing the present invention, the image quality is greatly increased by filtering blurring on the image dependent on the area and the extent of the blurring, while areas which are judged not to be blurred are not altered. Oversharpening of areas of the image is therefore minimised.

The invention claimed is:

1. A digital image filtering method comprising the steps of:
using a processor to perform:
selecting a first matrix of a plurality of pixels from a digital image to be displayed;
analysing the luminosity values of each of the pixels in the pixel matrix and calculating the luminosity difference between the maximum and minimum luminosity values thereof;
classifying a central pixel of the matrix according to the luminosity difference in comparison to a predetermined threshold luminosity value;
repeating the above selection, analysis and classification for each of the pixels of the image in turn; and
selecting a target pixel from the classified pixels for further analysis, said further analysis comprising the steps of:
selecting a second pixel matrix of which the target pixel is the central pixel;
analysing the classification of the pixels surrounding the target pixel in the second matrix; and
filtering the target pixel to an extent dependent upon the classification analysis.

2. A digital image filtering method according to claim 1, wherein the method is performed on images in one of a 1080-interlace format, a 720-progressive format, a 576-interlace format or a 480-interlace format.

3. A digital image filtering method according to claim 1, wherein the first pixel matrix selected comprises a 3×3 pixel matrix.

4. A digital image filtering method according to claim 1, wherein the first pixel matrix is selected from the top left-hand corner of the image to be displayed.

5. A digital image filtering method according to claim 1, wherein the target pixel of the second pixel matrix is classified to be a "blurred" pixel or a "clear" pixel.

6. A digital image filtering method according to claim 1, wherein the second pixel matrix selected comprises a 17×17 pixel matrix.

7. A digital image filtering method according to claim 1, further comprising using a processor to perform:
reducing the second pixel matrix in size in the event that a clear pixel is detected during the classification analysis, wherein the target pixel is maintained as the central pixel of the reduced matrix;
analysing the classification of the pixels surrounding the target pixel in the reduced matrix; and
filtering the target pixel to an extent dependent upon the classification analysis.

8. A digital image filtering system comprising:
a divider for selecting, in use, a first matrix of a plurality of pixels from a digital image to be displayed;
an image blurring detector arranged to analyse, in use, the luminosity values of each of the pixels in the pixel matrix and to calculate the luminosity difference between the maximum and minimum luminosity values thereof;
a flag memory arranged to classify, in use, a central pixel of the matrix according to the luminosity difference in comparison to a predetermined threshold luminosity value;

a selector arranged to select, in use, a target pixel from the classified pixels for further analysis, the target pixel being the central pixel of a second pixel matrix, the selector further being arranged to analyse, in use, the classification of the pixels surrounding the target pixel in the second matrix; and a filter arranged to filter, in use, the target pixel to an extent dependent upon the classification analysis.

9. A digital image filtering system according to claim 8, wherein the image format is one of a 1080-interlace format, a 720-progressive format, a 576-interlace format or a 480-interlace format.

10. A digital image filtering system according to claim 8, wherein the first pixel matrix selected comprises 3×3 pixel matrix.

11. A digital image filtering system according to claim 8, wherein the first pixel matrix is selected from the top left-hand corner of the image to be displayed.

12. A digital image filtering system according to claim 8, wherein the target pixel of the second pixel matrix is classified to be a "blurred" pixel or a "clear" pixel.

13. A digital image filtering system according to claim 8, wherein the second pixel matrix selected comprises a 17×17 pixel matrix.

14. A digital image filtering system according to claim 8, the selector being arranged such that, in use, the second pixel matrix is reduced in size in the event that a clear pixel is detected during the classification analysis, wherein the target pixel is maintained as the central pixel of the reduced matrix,
wherein the selector is further arranged to analyse, in use, the classification of the pixels surrounding the target pixel in the reduced matrix, and
wherein the filter is arranged to filter, in use, the target pixel to an extent dependent upon the classification analysis.

15. A digital image filtering method comprising the steps of:
using a processor to perform:
selecting a first matrix of a plurality of pixels from a digital image to be displayed;
analysing the luminosity values of each of the pixels in the pixel matrix and calculating the luminosity difference between the maximum and minimum luminosity values thereof;
classifying a central pixel of the matrix according to the luminosity difference in comparison to a predetermined threshold luminosity value as a "blurred" pixel or a "clear" pixel;
repeating the above selection, analysis and classification for each of the pixels of the image in turn; and
selecting a target pixel from the classified pixels for further analysis, said further analysis comprising the steps of:
selecting a second pixel matrix of which the target pixel is the central pixel;
analysing the classification of the pixels surrounding the target pixel in the second matrix; and
sharpening the target pixel when the analyzing of the classification of the pixels surrounding the target pixel determines there are no "clear" pixels in the second matrix;
wherein the extent of sharpening is dependent upon the classification analysis.

16. A digital filtering method according to claim 15, wherein the processor further performs:
reducing the second pixel matrix in size in the event that a "clear" pixel is detected during the analysing of the classification of the pixels surrounding the target pixel determines there is a "clear" pixel in the second pixel matrix, wherein the target pixel is maintained as the central pixel of the reduced matrix;
analysing the classification of the pixels surrounding the target pixel in the reduced matrix; and
sharpening the target pixel when the analysing of the classification of the pixels surrounding the target pixel in the reduced matrix determines there are no "clear" pixels in the reduced matrix, wherein the extent of sharpening is dependent upon the classification analysis.

17. A digital image filtering system comprising:
a divider for selecting, in use, a first matrix of a plurality of pixels from a digital image to be displayed;
an image blurring detector arranged to analyse, in use, the luminosity values of each of the pixels in the pixel matrix and to calculate the luminosity difference between the maximum and minimum luminosity values thereof;
a flag memory arranged to classify, in use, a central pixel of the matrix according to the luminosity difference in comparison to a predetermined threshold luminosity value as a "blurred" pixel or a "clear" pixel;
a selector arranged to select, in use, a target pixel from the classified pixels for further analysis, the target pixel being the central pixel of a second pixel matrix, the selector further being arranged to analyse, in use, the classification of the pixels surrounding the target pixel in the second matrix; and
a filter arranged to sharpen, in use, the target pixel, when the selector determines that there are no "clear" pixels in the second matrix, to an extent dependent upon the classification analysis.

18. A digital filtering system according to claim 17, the selector being arranged such that, in use, the second pixel matrix is reduced in size in the event that a "clear" pixel is detected during the analysis of the classification of the pixels surrounding the target pixel in the second matrix, wherein the target pixel is maintained as the central pixel of the reduced matrix,
wherein the selector is further arranged to analyse, in use, the classification of the pixels surrounding the target pixel in the reduced matrix, and
wherein the filter is further arranged to sharpen, in use, the target pixel, when the selector determines there are no "clear" pixels in the reduced matrix, to an extent dependent upon the classification analysis.

* * * * *